United States Patent [19]

Strawn

[11] 3,848,411

[45] Nov. 19, 1974

[54] CONTROL CIRCUIT FOR AN ELECTROMECHANICAL ACTUATOR

[75] Inventor: Charles F. Strawn, Arlington, Tex.

[73] Assignee: Johnson Service Company, Milwaukee, Wis.

[22] Filed: Jan. 26, 1973

[21] Appl. No.: 326,854

[52] U.S. Cl............................. 60/432, 60/DIG. 2
[51] Int. Cl........................ F15b 11/12, F15b 15/18
[58] Field of Search ...... 60/432; 91/363 R; 318/657

[56] References Cited
UNITED STATES PATENTS

| | | | |
|---|---|---|---|
| 3,108,213 | 10/1963 | Golder et al........................ | 318/657 |
| 3,200,591 | 8/1965 | Ray....................................... | 60/432 |
| 3,408,548 | 10/1968 | Coia............................... | 318/657 X |
| 3,626,283 | 12/1971 | James............................. | 318/657 X |

Primary Examiner—Edgar W. Geoghegan
Assistant Examiner—William F. Woods
Attorney, Agent, or Firm—Johnson, Dienner, Emrich, Verbeck & Wagner

[57] ABSTRACT

A control circuit for a hydraulic actuator includes a signal comparator circuit responsive to DC command and feedback signals to provide a control signal proportional to the difference between the command and sense signals, a first switching circuit responsive to the control signal to energize a pump of the actuator which pumps hydraulic fluid into an expandable chamber via an inlet port to thereby drive an actuator rod from a retracted position to an extended position against the force of a restoring spring, a second switching circuit responsive to the control signal to close a dump valve, sealing an outlet port of the expandable chamber to maintain the hydraulic fluid in the expandable chamber, and a feedback circuit having actuator rod position sensing apparatus for producing an AC sense signal indicative of the position of the actuator rod and a circuit for deriving a DC feedback signal from the AC sense signal for the signal comparator circuit; the first switching circuit being disabled to energize the pump when the feedback signal indicates the actuator rod has moved to the desired position, and the second switching circuit being disabled to permit the dump valve to open in response to a decrease in the command signal, permitting the actuator rod to retract under the force of the restoring spring.

12 Claims, 4 Drawing Figures

CONTROL CIRCUIT FOR AN ELECTROMECHANICAL ACTUATOR

BACKGROUND OF THE INVENTION

1. Field of the Invention.

This invention relates to environmental control systems, and more particularly, to a control circuit for an electromechanical actuator for use in such systems.

2. Description of the Prior Art.

Electromechanical actuators are frequently used in environmental control systems for operating valves, dampers, etc., of the system in order to achieve a desired environmental condition. Such systems generally include control circuits, responsive to command signals supplied by a condition sensing device, such as a bimetallic element, diaphram, bellows, etc., to generate control signals for energizing an electromechanical actuator to effect operation of a valve, for example, to provide automatic compensation for a change in an environmental condition.

The control circuits for such systems must be operable to detect the difference in amplitude between a command signal and a feedback signal supplied to inputs of the control circuit to provide the necessary drive signals for an associated actuator device. The command signal represents a desired position for the actuator shaft, and the feedback signal represents the actual position of the actuator shaft.

Accordingly, most known control circuits include a balance network, such as a resistive bridge circuit, for comparing the amplitudes of command and sense signals supplied to the control circuits. Such bridge circuits frequently include at least one variable resistance device, such as a slidewire resistor, having a wiper mechanically coupled to the actuator shaft to vary the resistance of the slidewire resistor as a function of the position of the shaft. However, slidewire resistors are characterized by friction losses as well as poor reliability and costly construction.

In control systems which employ hydraulic valve actuators, the balance network is responsive to a predetermined difference in the command and feedback signals to provide a control signal for effecting energization of a pump to permit hydraulic fluid to be pumped into an expandable chamber of the actuator thereby moving an actuator rod to a desired position to set a valve which is mechanically linked to the actuator rod. However, in known systems employing hydraulic valve actuators, the actuator rod is moved against the force of a restoring spring, and consequently the control circuit associated therewith must provide a drive signal for continuously energizing the pump to maintain the actuator rod at the desired position.

SUMMARY OF THE INVENTION

The present invention provides a control circuit for an electromechanical actuator which employs frictionless feedback to produce a feedback signal representing the actual position of the actuator rod. The control circuit includes actuator shaft position sensing means which produces an AC sense signal indicative of the position of the actuator shaft and means for deriving a DC feedback signal from the AC sense signal.

The control circuit employs a DC signal comparator circuit for comparing the DC feedback signal with a DC command signal representing a desired position for the actuator shaft. Accordingly, the control circuit, which employs DC input signals, is substantially unaffected by signal transients on input sensing lines.

In addition, the control circuit of the present invention is operable only upon signal command to effect movement of the actuator shaft.

In an exemplary embodiment, described with reference to an application for controlling a hydraulic valve actuator, the control circuit provided by the present invention includes signal comparator means responsive to command and feedback signals supplied to inputs thereof to provide a control signal for effecting selective enabling of first and second switching means. The first switching means is operable when enabled to energize pump means of the hydraulic actuator to cause hydraulic fluid to be pumped into an expandable chamber of the hydraulic actuator, moving the actuator rod against the force of a restoring spring to an extended position. The second switching means is operable when enabled to close dump valve means to maintain the hydraulic fluid within the expandable chamber.

In accordance with a feature of the invention, the first and second switching means comprise first and second threshold detecting circuits which have different threshold settings. The turn-on threshold of the second threshold detecting circuit is lower than both the turn-on and the turn-off thresholds of the first threshold detecting circuit. Accordingly, for a given control signal, the second threshold detecting circuit will be enabled prior to the enabling of the first threshold detecting circuit such that dump valve means will be operated to close an outlet of the expandable chamber before the pump means is energized permitting the actuator rod to be driven from its retracted position when the pump means is energized.

The control circuit further includes feedback means including actuator rod position sensing means which is operable to provide an AC sense signal which varies as the actuator rod is moved, thereby indicating the position of the actuator rod. The feedback means further includes means for deriving a DC feedback signal from AC sense signal. Accordingly, when the actuator rod has been driven to the desired position, the feedback signal provided by the feedback means, as extended to an input of the signal comparator means, effects disabling of the first threshold detecting circuit, and deenergization the the pump means. However, the second threshold detecting circuit remains enabled. Thus, when the pump means is disabled, the actuator rod is maintained in a stationary position, since the dump valve means remains energized.

Thereafter, when the command signal decreases a predetermined amount relative to the feedback signal, the second threshold detecting circuit is disabled, deenergizing the dump valve means to permit the hydraulic fluid to flow out of the expandable chamber whereby the actuator rod is returned to its retracted position through the force of the restoring spring.

DESCRIPTION OF A PREFERRED EMBODIMENT

Figure 1:
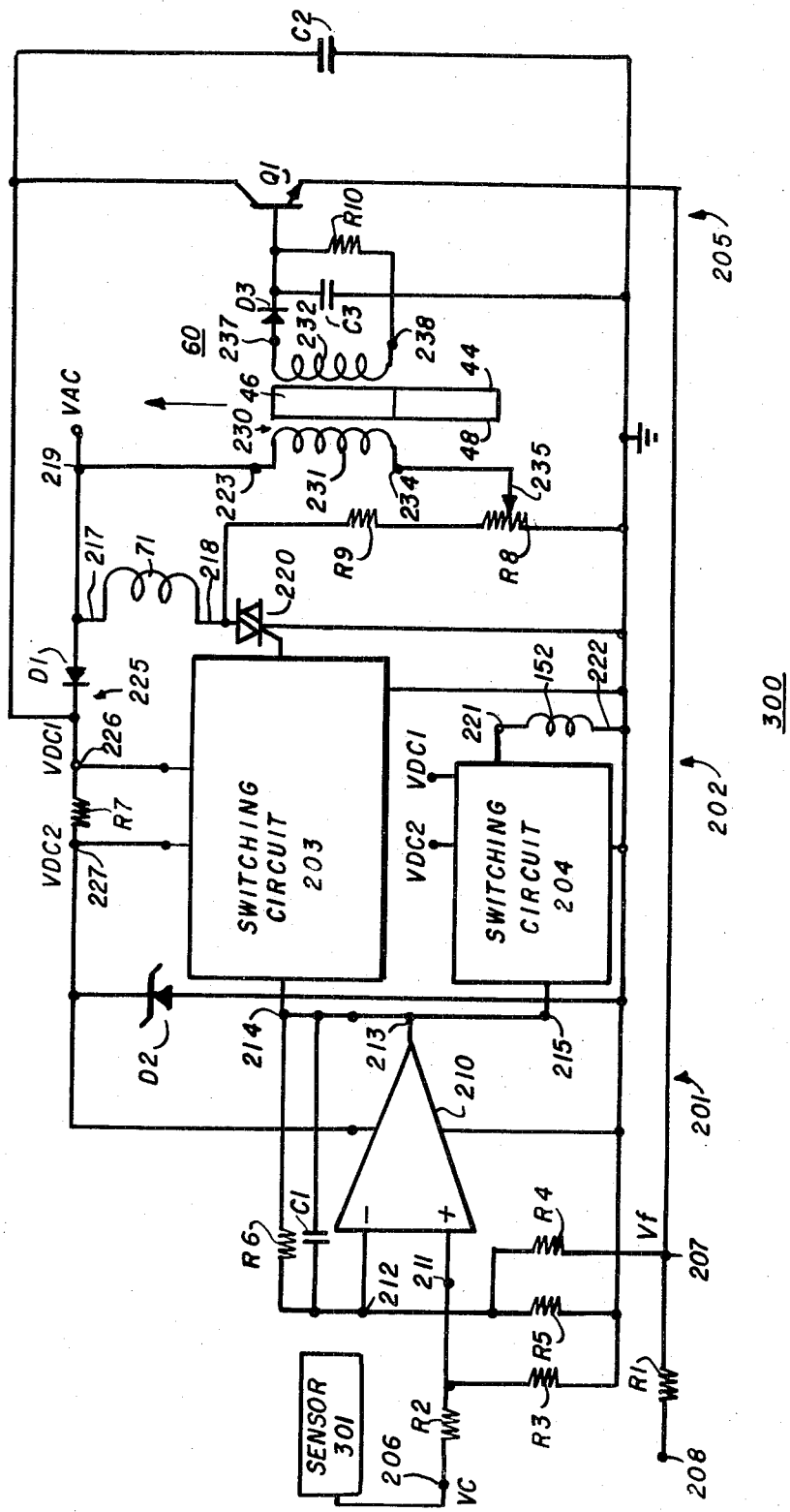
FIG. 1 is a schematic circuit and partial block diagram of an exemplary embodiment of an electronic control circuit provided by the present invention for use in controlling the operation of a hydraulic actuator.

Referring to FIG. 1, there is shown a schematic circuit and partial block diagram for the electronic control circuit 300 provided by the present invention. The electronic control circuit 300 will be described with reference to an exemplary embodiment in an application for controlling a hydraulic actuator in an environmental control system.

Figure 2:
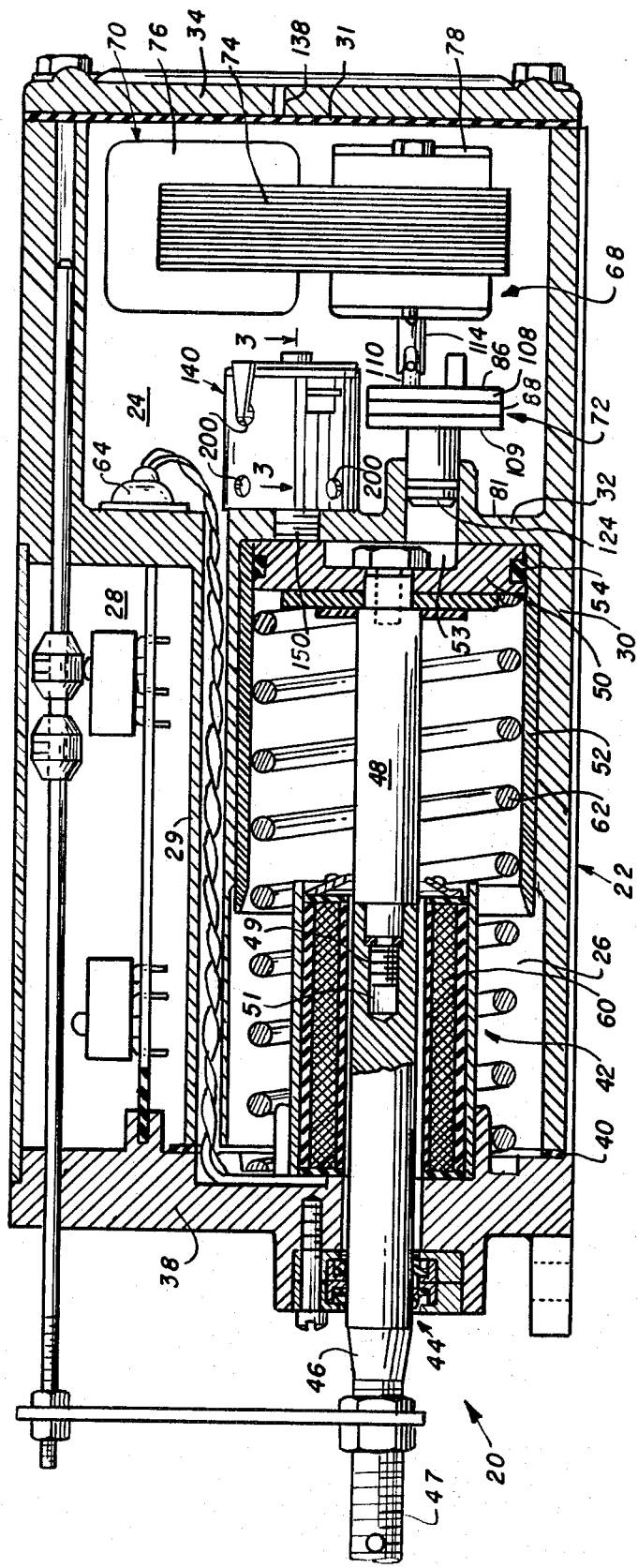
FIG. 2 is a cross-sectional view of a hydraulic actuator which can be controlled by the electronic control circuit shown in FIG. 1.

Referring to FIG. 2, there is shown a cross-sectional view of an embodiment of one hydraulic actuator 20, which may be controlled by the electronic control circuit 300 of the present invention. The hydraulic actuator 20 is fully described in the copending application, Ser. No. 326,855 of William F. Nolden which was filed concurrently with the present application and was assigned to the same assignee as the present invention. Accordingly, the actuator 20 will be described in the present application only to the extent necessary to aid in the operation of the electronic control circuit 300. In addition, the reference numerals used for the elements of the hydraulic actuator 20 described in the present application correspond to those used for like elements in the copending application referred to above.

The hydraulic actuator 20 includes an elongated housing 22 having rear and forward fluid chambers 24 and 26, respectively. A narrow passageway 29 extending substantially the entire length of the forward chamber 26 interconnects the front and rear chambers 24 and 26, respectively.

An actuator assembly 42 is contained within the forward chamber 26 and comprises a control element, or actuator rod 44 slideably mounted axially through the front chamber 26 and extending forwardly of the housing 22. The actuator rod 44 is constructed as a two-piece shaft in which the forward portion 46 is made of non-magnetic permeable material and the rearward portion 48 is made of magnetic permeable material.

The forward portion 46 of the actuator rod 44 has a threaded end 47 which is adapted to be connected through mechanical linkage (not shown) to a radiator valve, damper, or the like for operating such valve or damper as a function of the position of the actuator rod 44, as the actuator rod 44 is extended and retracted.

The intermediate length of the actuator rod 44 moves through the center of a feedback coil assembly 60 as the control element is extended and retracted, and the insertion of the magnetic permeable portion 48 of the actuator rod 44 varies the inductance of the feedback coil assembly 60 to provide a variable control signal as will be described hereinafter.

A piston 50 is secured crosswise on the rear end of the actuator rod 44. This piston 50 is adapted to reciprocate in bore of cylindrical piston 52 which is mounted at the rear end of the forward chamber 26. The piston and the internal wall 32 define an expandable chamber 53.

A compression spring 62 normally urges the piston and associated actuator rod 44 to a retracted position as illustrated in FIG. 2.

Outward displacement of the actuator rod 44 is effected by the energization of a motor pump assembly 68 by a control signal provided by the control circuit 300. The motor pump assembly 68 comprises a motor 70 and a pump 72. The motor 70 has a drive shaft 114 which is coupled to a drive shaft 110 of the pump 72. The pump 72, when driven by motor 70, is operable to pump hydraulic fluid via pump outlet passageway 124 from the rear chamber 24 into the expandable chamber 53.

The forward and rear fluid chambers 24, 26 are completely filled with hydraulic fluid, and when the motor 70 is energized, the pump 72 forces the hydraulic fluid under pressure through the pump outlet passageway 124 into the area behind piston 50, to drive the piston 50 and the associated actuator rod 44 outwardly against the force of compression spring 62. The pump assembly 72 includes a check valve (not shown) which is mounted within the pump outlet passageway 124 to prevent the return of hydraulic fluid to the rear chamber 24 through the passageway 124 and the pump 72.

As will be described in more detail hereinafter, the feedback coil assembly 60 provides a control signal for effecting the energization of the motor 70 in response to the movement of the magnetic permeable portion 48 of the actuator rod 44 relative to the feedback coil 60. When the pump motor 70 is deenergized, the check valve of the pump assembly 72 prevents the hydraulic fluid from flowing out of the expandable chamber 53 through the pump outlet passageway 124, and thus, the actuator rod 44 will be held in a stationary position. This manner of operation is a substantial improvement over the prior art structures which require the pump assembly to be continuously operated to hold the actuator rod in a predetermined extended position.

To permit the actuator rod 44 to thereafter be returned to its retracted position, a dump valve assembly 140 is provided. The dump valve assembly is operable to provide a return passageway for the hydraulic fluid from the forward chamber 26 to the rear chamber 24 through the internal wall 32 via an inlet passageway 150 and outlet ports 200 of the dump valve assembly 140.

Figure 3:
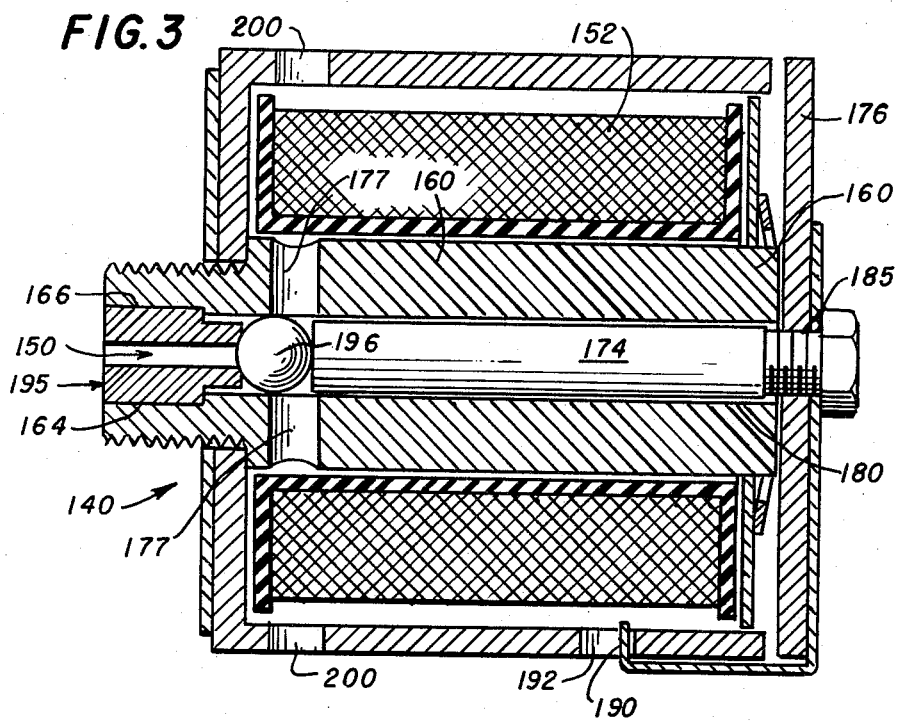
FIG. 3 is an enlarged cross-sectional view of a dump valve assembly of the hydraulic actuator as shown in FIG. 2, taken along lines 3—3 of FIG. 2 and looking in the direction of the arrows.

Referring to FIG. 3, which is a sectional view of the dump valve assembly 140 taken along lines 3-3 of FIG. 2 and looking in the direction of the arrows, the actuator means for the dump valve assembly 140 is provided by the combination of a plunger 174, an armature 176 and an operating solenoid 152. The plunger 174 is slideably mounted in a center axial opening of a core 160 which in turn is positioned in the center of the toroidal-shaped solenoid 152.

A check valve 195, including a ball 196 and a valve fitting 164 is operable to close off the inlet port 150 whenever the armature 176 is pulled inwardly. The ball 196 is inserted in the space between the inner end of plunger 174 and the valve fitting 164.

The armature 176 is attracted to the solenoid 152 whenever the solenoid 152 is energized in response to a control signal provided by the control circuit 300, (FIG. 1) causing the plunger 174 to move the ball 196 against the valve fitting 164, closing the dump valve inlet passageway 150. Accordingly, whenever the solenoid 152 is energized, the hydraulic fluid will be retained in the expandable chamber 53.

Upon the deenergization of the solenoid winding 152, the attraction of armature 176 is terminated, and accordingly, the fluid under pressure in the expandable chamber 53 may pass through the dump valve inlet port 150, through a radial channel 177 formed in the core 160, which supports the plunger 174, and into the rear chamber 24 through a plurality of openings 200 formed in the housing 142 of the dump valve assembly 140.

It will thus be appreciated that upon the deenergization of the solenoid winding 152, the hydraulic fluid contained in the expandable chamber 53 is then free to pass through the inlet port 150 and into the rear chamber 24 until the compression spring 62 returns the piston 50 (and the actuator rod 44) to the fully retracted position as shown in FIG. 2.

Actuator Control Circuit

The manner in which the actuator control circuit 300 is operable to provide signals for controlling the energization of the pump motor assembly 68 and the dump valve assembly 140 will now be set forth.

Referring again to FIG. 1, the control circuit 300 includes a signal comparator stage 201, a switching stage 202, including first and second switching circuits 203 and 204, respectively, and a feedback stage 205.

The signal comparator stage 201 of the control circuit 300 is responsive to a command signal Vc, representing a desired position for the actuator rod 44, and a feedback signal Vf, representing the actual position of the actuator rod 44, to provide a control signal Vo for effecting movement of the actuator rod 44 to a desired position.

The command signal Vc is provided by a condition sensing device 301, such as a bimetallic element, a diaphragm, bellows or the like, which continuously monitors a characteristic of the system, such as temperature, humidity or steam pressure and supplies a command signal Vc to the signal comparator stage 201 over an input 206 of the control circuit 300.

The feedback signal Vf, which is provided by the feedback stage 205 of the control circuit 300, is supplied to a further input 207 of the signal comparator stage 201.

The logic level signal Vf, which represents the position of the actuator rod 44, may also be extended over resistor R1 and terminal 208 to control heating and cooling switches in a multizone master control system.

The signal comparator stage 201 may comprise a differential amplifier 201 having a non-inverting input 211 connected over a resistor R2 to input terminal 206 of the control circuit 300 to receive the command signal Vc supplied thereto, and over a resistor R3 to ground or a point of reference potential for the control circuit 300. Differential amplifier 210 also has a inverting input 212 connected over a resistor R4 to the output of the feedback stage 205 at the emitter of a transistor Q1 to receive the feedback signal Vf, and over a resistor R5 to ground. The differential amplifier 210 also has associated feedback resistor R6 and feedback capacitor C1 connected in parallel between the output of the differential amplifier at terminal 213 and the inverting input 212 of the amplifier 210.

The differential amplifier 210 is operable to compare a command signal Vc extended to the non-inverting input 211 of the amplifier 210 over resistor R2 from input terminal 206 with a feedback signal Vf extended to the inverting input 212 of the differential amplifier 210 over resistor R4 from the output of the feedback stage 205.

Differential amplifier 210 responsively provides a control signal Vo at the output 213 thereof which is proportional to the difference between the command signal Vc and the feedback signal Vf extended to the two inputs 211 and 212 of the amplifier 210. The control signal Vo provided by the signal comparator stage 201 is extended to individual inputs 214 and 215 of the switching circuits 203 and 204, respectively. The switching circuits 203 and 204 of switching stage 202 each comprise a threshold detecting circuit which may, for example, be a Schmitt trigger circuit.

One of the Schmitt trigger circuits 203 is operable when enabled to effect energization of the winding 71 of the pump motor 70. Motor winding 71 has one end 217 connected to source of AC potential supplied to the control circuit 200 over a terminal 219, and a second end 218 connected to ground over a controlled switching device 220, which is embodied as a Triac. The Triac 220 has a control electrode connected to the output of the Schmitt trigger circuit 203.

The other Schmitt trigger circuit 204 is operable when enabled to effect energization of the solenoid winding 152 of the dump valve assembly 140. The solenoid winding 152 has a first end 221 connected to the output of Schmitt trigger circuit 204 and a second end 222 connected to ground.

Digressing, the control circuit 300 also includes a DC power supply circuit, indicated generally at 225, which includes a rectifier diode D1, a resistor R7, a capacitor C2 and a Zener diode D2. The power supply circuit 225 is operable to derive DC voltages at first and second levels at points 226 and 227, respectively. Diode D1 is connected between AC input terminal 219 and point 226 to provide a half-wave rectified DC voltage at a first level VDC1 at point 226. Capacitor C2, which is connected between point 226 and ground, acts as a ripple filter.

Resistor R7 is connected between points 226 and 227 to provide a DC voltage at a second level VDC2 at point 227. The Zener diode D2, which is connected between point 227 and ground, serves to provide a regulated DC voltage at point 227.

The unregulated DC voltage provided at point 226 is extended to first power inputs of the two Schmitt trigger circuits 203 and 204, and the regulated DC voltage provided at point 227 is extended to second power inputs of the two Schmitt trigger circuits 203 and 204 and to a power input of the differential amplifier 210.

As will be described in more detail hereinafter, the turn-on threshold of Schmitt trigger circuit 204 is lower than both the turn-on and the turn-off thresholds of Schmitt trigger circuit 203. Accordingly, whenever the control voltage Vo provided at the output 213 of the differential amplifier 210 exceeds the turn-on threshold of Schmitt trigger circuit 204, Schmitt trigger circuit 204 will be enabled, energizing the solenoid 152 of the dump valve assembly 140 (FIG. 2) closing the dump valve inlet port 150 to prevent hydraulic fluid from escaping from the expandable chamber 53.

Thereafter, if the control signal Vo provided at output 213 of the differential amplifier 210 continues to increase to the turn-on threshold of Schmitt trigger circuit 203, the Triac 220 will be enabled to effect energization of winding 71 of the pump motor 70.

When the pump motor 70 is energized, hydraulic fluid will be pumped into the piston chamber 53 (FIG. 2), driving the piston 50 and the associated actuator rod 44 outwardly against the force of the compression spring 62.

As shown in FIG. 2, when the actuator rod 44 is in the retracted position, the portion 46 of the actuator rod 44 which is of non-magnetic permeable material lies within the central core of the feedback coil assembly 60. However, when the actuator rod 44 is driven outwardly, as hydraulic fluid is pumped into the forward chamber 26, the portion 48 of the actuator rod 44 which is of a magnetic permeable material will be moved to lie within the central core of the feedback coil assembly 60.

Referring again to FIG. 1, the feedback coil assembly 60 is shown to include a transformer 230 having a primary winding 231 and a secondary winding 232. The actuator rod 44, shown schematically in FIG. 1, is shown in the retracted position with the non-magnetic permeable portion 46 normally positioned within the two windings 231 and 232 of the feedback transformer 230.

The primary winding 231 of the feedback transformer 230 has one end 233 connected to the AC voltage source at terminal 219 and a second end 234 connected to a wiper 235 of a potentiometer R8. Potentiometer R8 is connected in series with a resistance R9 between the anode of a Triac 220 and ground such that an AC signal is supplied to the primary winding 231 of the feedback transformer 230.

The potentiometer R8 provides a bucking voltage to compensate for loading of the supply transformer, not shown, whenever the pump motor 70 is energized.

The secondary winding 232 of the feedback transformer 230 has one end 237 connected over a diode D3 to the base of transistor Q1 of the feedback stage 205. The base of transistor Q1 is further connected over a capacitor C3 to ground.

The collector of transistor Q1 is connected to point 226 to receive a DC voltage at level VDC1, and the emitter of transistor Q1 is connected over resistor R4 to the negative input 212 of the differential amplifier 210.

As the actuator rod 44 is moved outwardly from its retracted position in response to energization of the pump motor 70 (which causes hydraulic fluid to be pumped into the expandable chamber 53) the magnetic permeable portion 48 of the actuator rod 44 will be moved to lie within the two windings 231, 232 of the feedback transformer 230, increasing the efficiency of the transformer 230. Accordingly, signal coupling between the primary winding 231 and the secondary winding 232 of the feedback transformer will be increased and the amplitude of the AC signal coupled from the primary winding 231 to the secondary winding 232 will increase in proportion to the amount the actuator rod 44 is moved from its fully retracted position.

The AC signal coupled to the secondary winding is half-wave rectified by diode D3 and filtered by capacitor C3 to provide base drive for transistor Q1. Accordingly, as the amplitude of the AC signal coupled to the secondary winding 232 of the feedback transformer 230 increases, the base drive signal for transistor Q1 will also increase. Correspondingly, a DC output voltage $Vf$ (the feedback signal) which is provided at the emitter of transistor Q1 will also increase in direct relationship with the position of the actuator rod 44. The feedback signal $Vf$ thus produced is extended to input 207 of the signal comparator circuit 201.

Operation of the Actuator Control Circuit

Figure 4:
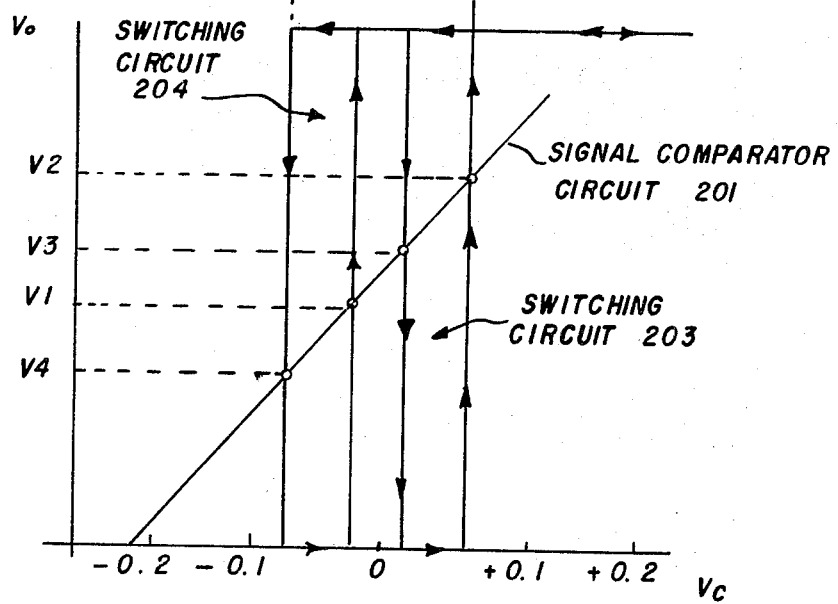
FIG. 4 is a graphical display of the functional operation of the electronic control circuit shown in FIG. 1.

The operation of the control circuit 300, shown in FIG. 1, provided by the present invention will be described with reference to the control function diagram for the control circuit 300 given in FIG. 4, which shows the relationship between the control signal $Vo$ as a function of changes in the command signal $\Delta Vc$. Assuming initially that the actuator rod 44 is in the retracted position that the pump motor winding 71 is deenergized and the dump valve solenoid 152 is deenergized so that dump valve 140 is open, when the command signal $Vc$ increases relative to the feedback signal $Vf$, the control signal $Vo$ provided by the differential amplifier 210 begins to increase. When the control signal $Vo$ provided by the differential amplifier 210 reaches a level $Vl$, the turn-on threshold of Schmitt trigger circuit 204, as shown in FIG. 4, Schmitt trigger circuit 204 is enabled causing solenoid coil 152 of the dump valve assembly 140 to be energized, closing the inlet port 150 (FIG. 2) of the dump valve assembly 140.

As the command signal $Vc$ continues to increase such that the amplified difference between the command signal $Vc$ and the feedback signal $Vf$ extended to input 212 of the differential amplifier 210 reaches a voltage level $V2$, the turn-on threshold of Schmitt trigger circuit 203, the Schmitt trigger circuit 203 will be enabled, enabling Triac 220, causing the pump motor winding 71 to be energized.

Accordingly, as hydraulic fluid is pumped into the expandable chamber 53 (FIG. 2), the piston 50 and the actuator rod 44 are driven outwardly from the retracted position until the magnetically permeable portion 48 of the actuator rod 44 moves partway through the center of the feedback transformer 230.

The movement of the magnetically permeable portion 48 through the center of the feedback transformer 230 proportionally increases the efficiency of the feedback transformer 230. Consequently, the AC feedback signal, as rectified by diode D3, controls the conductivity of transistor Q1 to provide a DC feedback signal $Vf$ which increases to approach the signal level of the command signal $Vc$ as the actuator rod 44 moves outwardly relative to the feedback transformer windings 231 and 232.

As the amplitude of the feedback signal $Vf$ increases relative to the command signal $Vc$, the amplitude of the control signal $Vo$ provided by the differential amplifier 210 will decrease. When the control signal $Vo$ reaches a level $V3$ (FIG. 4) the Schmitt trigger circuit 203 will be disabled, thereby effecting deenergization of the pump motor 70. When the pump motor 70 is deenergized, the actuator rod 44 will be held in stationary position since the check valve of the pump 72 prevents the hydraulic fluid from flowing back through the pump outlet passageway 124.

If thereafter the command signal $Vc$ again increases relative to the feedback signal $Vf$ such that the amplified difference between the command and feedback signals again reaches the voltage level $V2$, the pump motor winding will be reenergized. Consequently, the actuator rod 44 will be driven further from its retracted position until the desired point has been reached as indicated by the increased level of the feedback signal V*f*, decreasing the control signal level V*o* to the value V3 at which time the pump motor winding 71 will again be deenergized.

When the command signal V*c* decreases relative to the feedback signal V*f*, the control signal V*o* provided at the output of differential amplifier 210 also decreases. When the output signal V*o* reaches the level V4 (FIG. 4), the turn-off threshold for Schmitt trigger circuit 204, Schmitt trigger circuit 204 will be disabled, thereby deenergizing the solenoid 152 of the dump valve assembly 140, permitting the dump valve to open. At such time, the hydraulic fluid will bleed out of the expandable chamber 53 into the rear chamber 24 of the hydraulic actuator housing permitting the actuator element 44 to retract until the feedback voltage V*f* is again slightly less than the command signal V*c*. When the difference between the command signal V*c* and the feedback signal V*f* again reach the level V*l*, Schmitt trigger circuit 204 will be enabled causing the dump valve to reclose whereby the position of the actuator element 44 will remain fixed until a further change in the command signal V*c* occurs.

I claim:

1. In a control system including an actuator means having an actuator shaft movable between at least first and second positions, shaft positioning means including drive means and hold means for positioning said shaft at any one of a plurality of positions including said first and second positions and positions intermediate said first and second positions, and position sensing means for providing a sense signal indicating the position of said shaft, a control circuit responsive to said sense signal and a command signal indicating a desired position for said shaft for effecting energization of said drive means and said hold means for positioning said shaft, said control circuit comprising first switching means operable when enabled to provide an energizing signal for said drive means, second switching means operable when enabled to provide an energizing signal for said hold means, said first and second switching means being enabled concurrently whenever the difference between said command and sense signals exceeds a first predetermined amount to permit said shaft to be driven from a given position toward said second position, and to be maintained at any one of said discrete positions intermediate said given position and said second position, said second switching means being enabled independently of said first switching means whenever the difference between said command and sense signals exceeds a second predetermined amount to permit said shaft to be moved from a given position toward said first position and to be maintained at any one of the positions intermediate said given position and said first position.

2. A control circuit as set forth in claim 1 which includes signal comparator means responsive to said command and sense signals for providing a control signal that is proportional to the difference in the amplitudes of said command and sense signals for selectively enabling said first and second switching means as a function at the difference between the command and sense signals.

3. A control circuit as set forth in claim 2 wherein said position sensing means provides an AC sense signal and wherein said signal comparator means includes means for deriving a DC sense signal from the AC sense signal provided by said positioning means.

4. In a control system including an actuator means having an actuator shaft movable between at least first and second positions, shaft positioning means including drive means and hold means for positioning said shaft, bias means normally urging said shaft toward said first position, and position sensing means for providing a sense signal indicating the position of the shaft, a control circuit for effecting selective energization of said drive means and said hold means for positioning said shaft, said control circuit comprising first switching means operable when enabled to provide an energizing signal for said drive means, second switching means operable when energized to provide an energizing signal for said hold means, and signal comparator means responsive to said sense signal and a command signal indicative of a desired position for said shaft to enable said first and said second switching means concurrently whenever the difference between said command and sense signals exceeds a first predetermined amount to permit said shaft to be driven to and maintained at said desired position, said signal comparator means thereafter being responsive to a further predetermined difference between said command and sense signals to enable said second switching means independently of said first switching means to permit said shaft to be moved from said desired position toward said first position.

5. In a control system including an actuator means having an actuator shaft movable to a plurality of discrete positions, shaft positioning means including drive means and hold means for positioning said shaft at any one of said positions, bias means normally urging said shaft toward a first one of said positions, and position sensing means for providing a sense signal indicating the position of said shaft, a control circuit for providing selective energization of said drive means and said hold means to enable said shaft to be positioned at a desired one of said discrete positions, said control circuit comprising first switching means operable when enabled to provide a signal for energizing said drive means, second switching means operable when enabled to provide a signal for energizing said hold means, and input means responsive to said sense signal and to a command signal indicative of a desired position for said shaft to provide a control signal of an amplitude proportional to the difference between said command and sense signals for said first and second switching means, said first and second switching means including first and second threshold detecting means, respectively, having different preselected turn-on and turn-off thresholds to permit said first and second switching means to be enabled concurrently in response to a control signal of a first amplitude to effect energization of said drive means and said hold means permitting said shaft to be driven from one of said positions toward a second one of said positions and to permit said second switching means to be enabled independently of said first switching means in response to a control signal of a lower amplitude permitting said shaft to be moved toward said first position and to be maintained at any one of the positions intermediate said second and first positions.

6. In a control system including an actuator means having an actuator shaft movable to a plurality of discrete positions and means associated with said actuator shaft for providing a sense signal indicating the position of said actuator shaft, drive means operable when energized to drive said actuator shaft from a first one of said positions to a desired position and hold means operable when energized to enable said actuator shaft to be driven to and maintained in a desired position, a control circuit for controlling the operation of said actuator means, said control circuit comprising input means for providing a command signal representing the desired position for said actuator shaft, first switching means for controlling the operation of said drive means, second switching means for controlling the operation of said hold means, said first and second switching means being enabled concurrently whenever the difference in amplitudes of said command and sense signals exceeds a predetermined value to permit said actuator shaft to be driven toward said desired position, the amplitude of said sense signal changing as said actuator shaft is driven toward said desired position to thereby decrease the difference between said command and sense signals, said first switching means being disabled and said second switching means remaining enabled when the difference between said command and sense signals has decreased to a further predetermined value when said shaft is at said desired position whereby said drive means is deenergized and said acutator shaft is maintained at said desired position by said hold means, said second switching means being disabled to deenergize said hold means when said command signal decreases a predetermined amount relative to said sense signal to permit said actuator shaft to move toward said first position.

7. A control circuit as set forth in claim 6 wherein said first switching means comprises a first threshold detecting means having a preselected turnon threshold and a preselected turnoff threshold, and wherein said second switching means comprises a second threshold detecting means having a preselected turnon threshold and a preselected turnoff threshold, at least the turnoff threshold of said second threshold detecting means being lower than the turnoff threshold of said first threshold detecting means.

8. A control circuit as set forth in claim 6 wherein said input means includes a signal comparator means responsive to said command and sense signals to provide a control signal that is proportional to the difference in the amplitudes of said command and sense signals for selectively enabling said first and second switching means.

9. A control circuit as set forth in claim 8 wherein said first threshold detecting means comprises first Schmitt trigger means enabled whenever the amplitude of said control signal exceeds a first predetermined value and disabled when the amplitude of the control signal decreases to a second predetermined value, and wherein said second threshold detecting means comprises second Schmitt trigger means enabled at least whenever the amplitude of said control signal exceeds said first value and disabled when the amplitude of said control signal decreases to a third predetermined value which is less than said second predetermined value.

10. In a control system including a hydraulic actuator having an actuator shaft movable to a plurality of discrete positions, pump means operable when energized to pump hydraulic fluid into an expandable chamber of said hydraulic actuator via an inlet port to move the actuator shaft against the force of a restoring spring from a given position to a desired position, dump valve means operable when energized to close an outlet port of said expandable chamber to maintain the hydraulic fluid in said expandable chamber and thereby enable said actuator shaft to be driven to and maintained at said second position, and means associated with said actuator shaft for producing a sense signal which varies as a function of displacemnt of said actuator shaft to indicate the position of said actuator shaft, a control circuit comprising first switching means for controlling the operation of said pump means, second switching means for controlling the operation of said dump valve means, and signal comparator means responsive to said sense signal and a command signal indicative of the desired position for said shaft for enabling said first and second switching means, said signal comparator means being responsive to a first predetermined difference between the command and sense signals to enable said first and second switching means to effect energization of said pump means and said dump valve means to permit said actuator shaft to be moved to said desired position, said signal comparator means being responsive to the difference between the sense signal and the command signal when the shaft reaches the desired position to disable said first switching means while maintaining said second switching means enabled such that said pump means is deenergized and said dump valve means remains energized causing said actuator shaft to be maintained at said desired position, and said signal comparator means being responsive to a further difference between the command signal and the sense signal to disable said second switching means such that said dump valve means is deenergized, opening said outlet port permitting the hydraulic fluid to flow out of the expandable chamber to thereby permit said actuator shaft to be moved toward said first position under the force of the restoring spring.

11. A control circuit as set forth in claim 10 wherein said signal comparator means comprises differential amplifier means having a first input connected to receive said command signal and a second input connected to receive said sense signal, said differential amplifier means being operable to provide a control signal representing the difference between said command and sense signals for enabling said first and second switching means.

12. A control circuit as set forth in claim 10 wherein said first switching means comprises a first Schmitt trigger circuit having a first preselected turnon threshold and a first preselected turnoff threshold and wherein said second switching means comprises a second Schmitt trigger circuit having a second preselected turnon threshold and a second preselected turnoff threshold, at least said second turnoff threshold being lower than said first turnoff threshold to enable said second Schmitt trigger circuit to remain enabled to energize said dump valve means when said first Schmitt trigger circuit becomes disabled.

* * * * *